United States Patent [19]

Oberheuser

[11] 3,951,553
[45] Apr. 20, 1976

[54] APPARATUS FOR AIMING A GUN
[75] Inventor: Joseph H. Oberheuser, Trumbull, Conn.
[73] Assignee: The Perkin-Elmer Corporation, Norwalk, Conn.
[22] Filed: Oct. 7, 1974
[21] Appl. No.: 512,689

[52] U.S. Cl.............................. 356/251; 356/252
[51] Int. Cl.².......................................... G02B 23/10
[58] Field of Search........................... 356/251, 252

[56] References Cited
UNITED STATES PATENTS

| | | | |
|---|---|---|---|
| 3,007,051 | 10/1961 | Amara et al. | 356/252 X |
| 3,211,045 | 10/1965 | Gerhardt | 356/252 X |
| 3,816,005 | 6/1974 | Kirschner | 356/251 |

*Primary Examiner*—Archie R. Borchelt
*Attorney, Agent, or Firm*—Sal A. Giarratana; Francis L. Masselle; John K. Conant

[57] ABSTRACT

A spherical lens has a surface whereon a dichroic coating reflects light of known wavelength, substantially all other light being transmitted therethrough. Within the focal plane of the surface at fixed locations are respective proximal ends of a plurality of fiber light pipes. The distal ends of the fiber pipes are respectively connected to light emitting diodes whereby each diode is associated with one of the locations. In response to light being provided by a first diode, from the location associated therewith a light image of a first proximal end is transmitted to a first small region on the surface. The image of the first proximal end is collimated at the first small region and reflected therefrom. In response to light being provided by a second diode, from the location associated therewith a light image of a second proximal end is transmitted to a second small region on the surface. The image of the second proximal end is collimated at the second small region and reflected therefrom.

4 Claims, 1 Drawing Figure

U.S. Patent   April 20, 1976   3,951,553
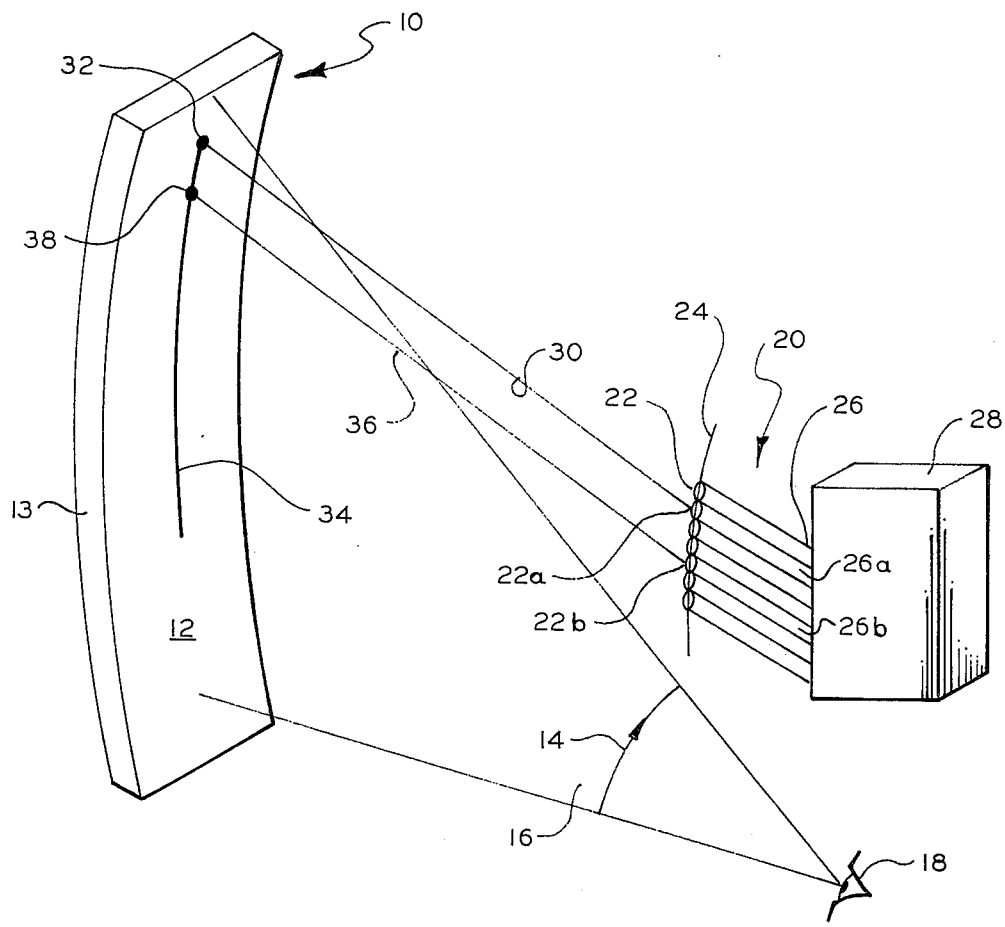

APPARATUS FOR AIMING A GUN

BACKGROUND OF THE INVENTION

1. Field of the Invention

This invention relates to optical indicators and more particularly to apparatus for aiming a gun.

2. Description of the Prior Art

Portable apparatus for accurately aiming a gun has long been sought after by military establishments throughout the world. One aspect of the aiming is causing the barrel of the gun to have a desired angle with respect to a horizontal plane (referred to as an angle of elevation). A desired angle of elevation of the gun is a function of the range of a target. The desired elevation is indicated by one type of apparatus which is known in the art as a heads-up display (referred to as a HUD).

Typically, the HUD includes a beam splitter comprised of a transparent plate having a coating which partially transmits and partially reflects received light. The beam splitter is fixedly connected to the gun in a manner which provides to an operator a view through the beam splitter of a target area.

Additionally connected to the gun is an aiming reticle disposed between a lamp and a collimating lens whereby light, comprising a collimated light image of the reticle, is received by the beam splitter. Because the beam splitter partially reflects light, the image is reflected from the beam splitter to the operator. The collimation of the image causes it to appear to the operator to be distant, although the beam splitter may be a few inches from the operator. Accordingly, the view is of the image superimposed upon the target area.

The reticle is usually comprised of a plurality of straight wire members in a parallel arrangement with equal spacing therebetween whereby the image is comprised of a plurality of equally spaced horizontal lines (referred to as elevation lines).

Typically, one of the elevation lines is identified as being associated with a target by a range finding device whereby the desired elevation is indicated by the identified elevation line. Additionally, when the operator adjusts the elevation of the gun to cause an alignment of the identified elevation line with the target, the gun has the desired elevation.

Because the image is comprised of a plurality of elevation lines, the operator may inadvertently cause an alignment of an unidentified elevation line with the target, thereby causing a projectile from the gun to miss the target. Additionally, it should be appreciated that the range of the target may vary widely. Therefore, it is desirable to have the lowest and highest elevation lines of the image define a large span (on the beam splitter). However, it is difficult to construct a lens for providing the image which defines the large span.

SUMMARY OF THE INVENTION

An object of the present invention is to provide apparatus for indicating a desired angle of elevation of a gun.

According to the present invention, a substantially spherical lens is mounted for rotation about the center of curvature of a surface thereof which reflects visible light of a first wavelength and transmits therethrough visible light of a second wavelength; a selected one of a plurality of sources of illumination is operable to transmit light having said first wavelength to said lens from the focal plane of said surface.

The present invention may be utilized to provide a compact, light weight, low cost inherently rugged aiming apparatus for a gun. The aiming apparatus is accurate over a large field of view of a target area.

The aiming apparatus may be used with a range finding device for providing a simplified indication of a desired elevation of a gun.

Other objects, features and advantages of the present invention will become more apparent in the light of the following detailed description of a preferred embodiment thereof as illustrated in the accompanying drawing.

BRIEF DESCRIPTION OF THE DRAWING

The sole FIGURE herein is a schematic block diagram of a preferred embodiment of the present invention.

DESCRIPTION OF THE PREFERRED EMBODIMENT

The present invention is predicated upon a spherical mirror having a focal surface concentric with the mirror, the radius of curvature of the focal surface being one-half the radius of curvature of the mirror. When light is transmitted to the mirror along a radius thereof from the focal surface, collimated light is reflected from the mirror whereby the reflected light appears to an observer to be transmitted from a source which is distant from the mirror.

Referring now to the drawing, a spherical lens 10 has an inner surface 12 and outer surface 13. The surface 12 has a dichroic coating thereon which reflects substantially all light having a wavelength substantially equal to 0.65 micro meters. Accordingly, for light having a wavelength substantially equal to 0.65 micro meters, the surface 12 is a spherical mirror.

The lens 10 is connected to a gun (not shown) whereby an elevation angle 14 measured from a horizontal reference line 16 equals the angle of elevation of the barrel of the gun. The elevation angle 14 is subtended from an eyepoint 18 at the center of curvature of the lens 10. In the preferred embodiment, an operator's line of sight to the lens 10 is from the eyepoint 18.

It is well known that when a target is viewed through a lens along a line of sight which is not perpendicular to the lens, the view of the target is distorted. Because the eyepoint 18 is at the center of curvature, the surfaces 12, 13 are always substantially perpendicular to the operator's line of sight thereby providing the operator with a large, undistorted, field of view through the lens 10.

Fixedly connected to the gun are a plurality of fiber pipes 20 whereby the pipes 20 have respectively fixed positions with respect to the lens 10. The pipes 20 have respective proximal ends 22 disposed within the focal surface of the surface 12 along a line of longitude 24. Preferably, the ends 22 are in a portion of the focal surface which is not along any line of sight through the lens 10 from the eyepoint 18 whereby the field of view is unoccluded.

Distal ends 26 of the fiber pipes 20 are coupled to respective diodes of a light emitting diode array within a range finder 28 which may be a portable laser ranging device or any other suitable device. Light emitting diodes, fiber light pipes and laser ranging devices are well known in the art.

The diodes are operable to respectively provide to the ends 26 light having a wavelength substantially equal 0.65 micro meters. The diodes are associated with respective ranges of targets. When light is provided to a distal end of a light pipe, the proximal end thereof transmits light to the surface 12.

In response to a target having a first range, a diode provides light to an end 26a which is transmitted from an end 22a along a path 30 to the lens 10 whereby an image of the end 22a is received at a small region 32 along a line of longitude 34 on the surface 12. Accordingly, in response to the target having the first range, the image of the end 22a is collimated at the small region 32 and reflected to the eyepoint 18.

In response to a target having a second range, a diode provides light to an end 26b which is transmitted from an end 22b along a path 36 to the lens 10 whereby an image of the end 22b is received at a small region 38 along the line 34. Accordingly, in response to the target having the second range, the image of the end 22b is collimated at the small region 38 and reflected to the eyepoint 18.

In accordance with the explanation given hereinbefore, an image of one of the ends 22 (referred to as a spot of light hereinafter) is provided along the line 34 at a small region having a location associated with a range of a target, thereby indicating a desired angle of elevation of the gun.

In response to the appearance of the spot of light, the operator moves the gun to cause the lens 10 to rotate about the eyepoint 18 to cause an alignment of the spot of light with the target. When the spot of light is aligned with the target, the gun has the desired elevation.

Thus there is described hereinbefore apparatus for indicating a desired elevation angle of a gun. It shall be understood that a similar apparatus may be used for indicating a desired azimuth angle of the gun.

Although the invention has been shown and described with respect to a preferred embodiment thereof, it should be understood by those skilled in the art that the foregoing and various other changes and omissions in the form and detail thereof may be made therein without departing from the spirit and scope of the invention.

Having thus described a typical embodiment of my invention, that which I claim as new and desire to secure by letters patent is:

1. Apparatus for indicating an aiming position of a gun comprising:
    a substantially spherical lens mounted for rotation about the center of curvature thereof, said lens having a reflecting surface which reflects visible light of a first wavelength and transmits therethrough visible light of a second wavelength; and
    a plurality of sources of illumination fixedly mounted with respect to said lens, said sources being operable to transmit light of said first wavelength to the reflecting surface of said lens from a focal surface thereof, each of said sources being positioned to direct light to a different region on the reflecting surface, each of said regions representing a different range, and said regions being within the line of sight of an observer viewing the lens from said center of curvature,
    whereby when the apparatus is operatively connected for the lens to rotate in synchronism with adjustments of the aiming position of a gun, and said regions on the reflecting surface are located to correspond with aiming positions of the gun for different ranges of the gun, respectively, and when one of said illumination sources representing a desired range for the gun is illuminated, said observer is able to see through the lens to observe a target scene beyond and also to observe when adjustments of the aiming position of the gun correspondingly rotate the lens until the illuminated region on the lens reflective surface is in register with a target in the target scene observed through the lens.

2. Apparatus according to claim 1 wherein said sources are comprised of a plurality of fiber light pipes having output ends substantially within said focal surface, input ends of said pipes being coupled, respectively, to a plurality of light sources which provide light of said first wavelength.

3. Apparatus according to claim 2 wherein said reflecting surface has a dichroic coating, said sources comprising a plurality of light emitting diodes respectively coupled to said light pipes.

4. Apparatus according to claim 2 wherein said output ends are disposed to provide an unoccluded field of view from said center of curvature through said lens.

* * * * *